US010222866B2

(12) United States Patent
Cao et al.

(10) Patent No.: US 10,222,866 B2
(45) Date of Patent: Mar. 5, 2019

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventors: Xiang Cao, Beijing (CN); Cheng Guo, Beijing (CN); Jundong Xue, Beijing (CN); Jun Wei, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 99 days.

(21) Appl. No.: 14/494,726

(22) Filed: Sep. 24, 2014

(65) Prior Publication Data

US 2015/0268736 A1    Sep. 24, 2015

(30) Foreign Application Priority Data

Mar. 24, 2014  (CN) ........................ 2014 1 0111747
Mar. 24, 2014  (CN) ........................ 2014 1 0111918

(51) Int. Cl.
*G06F 3/01* (2006.01)
*G06F 3/03* (2006.01)
*G06F 3/0482* (2013.01)

(52) U.S. Cl.
CPC ............ *G06F 3/017* (2013.01); *G06F 3/0304* (2013.01); *G06F 3/0482* (2013.01)

(58) Field of Classification Search
CPC ............. G06F 3/01; G06F 3/017; F06F 3/011
(Continued)

(56) References Cited

U.S. PATENT DOCUMENTS

2002/0080494 A1   6/2002  Meine
2007/0124694 A1*  5/2007  Van De Sluis ......... G06F 3/017
                                                   715/775
(Continued)

FOREIGN PATENT DOCUMENTS

CN          1860429 A      11/2006
CN        101651804 A       2/2010
(Continued)

*Primary Examiner* — Nitin Patel
*Assistant Examiner* — Amy Onyekaba
(74) *Attorney, Agent, or Firm* — Scully Scott Murphy & Pressers

(57) ABSTRACT

The present disclosure provides an information processing method and an electronic device, capable of solving the problem with the conventional solution that the user may not activate the interaction interface conveniently without knowing the position of the triggering control. The method comprises: obtaining at least one sensed parameter of an operator using the sensing unit; determining a parameter change of the operator based on the at least one sensed parameter; judging, based on the parameter change, whether an input action of the operator satisfies a first predetermined condition, so as to obtain a first judgment result, the first predetermined condition being satisfied when the operator changes from a first attitude to a second attitude different from the first attitude; determining the input action of the operator as a first input action and determining a mapped position of the operator on the display unit based on the parameter change, when the first judgment result indicates that the input action satisfies the first predetermined condition; determining a first control instruction associated with the first input action; and displaying a first graphic interaction interface at the mapped position in response to the first control instruction.

21 Claims, 6 Drawing Sheets

(58) Field of Classification Search
USPC .............. 345/156, 158; 463/37; 715/775
See application file for complete search history.

(56) References Cited

U.S. PATENT DOCUMENTS

| | | | |
|---|---|---|---|
| 2009/0027337 A1* | 1/2009 | Hildreth | G06F 3/011 |
| | | | 345/158 |
| 2011/0107216 A1* | 5/2011 | Bi | G06F 3/011 |
| | | | 715/716 |
| 2013/0120250 A1* | 5/2013 | Lin | G06F 3/011 |
| | | | 345/157 |
| 2013/0174036 A1 | 7/2013 | Han et al. | |
| 2013/0278499 A1* | 10/2013 | Anderson | G06F 3/01 |
| | | | 345/156 |
| 2013/0296057 A1* | 11/2013 | Gagner | G06F 3/017 |
| | | | 463/37 |

FOREIGN PATENT DOCUMENTS

| | | |
|---|---|---|
| CN | 102457688 A | 5/2012 |
| CN | 103376887 A | 10/2013 |

\* cited by examiner

INFORMATION PROCESSING METHOD AND ELECTRONIC DEVICE

CROSS-REFERENCE TO RELATED APPLICATION(S)

This application claims priority to Chinese Application No. 201410111747.4 filed on Mar. 24, 2014 and No. 201410111918.3 filed on Mar. 24, 2014, which are incorporated herein by reference in their entirety.

BACKGROUND OF THE INVENTION

Field of the Invention

The present disclosure relates to an electronic technology field, and more particularly, to an information processing method and an electronic device.

Description of the Related Art

With continuous development of science and technology, the electronic technology evolves rapidly. There are more and more types of electronic products and users have enjoyed various conveniences that come with such development of science and technology. Now, with various types of electronic devices, users are enjoying comfortable lives brought by the development of science and technology. For example, with touch control techniques, a user no longer has to press physical keys in order to control an electronic device. Moreover, remote recognition and interaction techniques enable the user to control the electronic device without touching it.

During a remote interaction between the user and the electronic device, in order to activate an interaction interface on the electronic device, firstly the user has to know where a virtual triggering control is positioned before moving a cursor associated with his/her hand or an operator onto the virtual triggering control. Sometimes, the user even has to keep his/her hand or the operator at a position for a predetermined time period in order to activate the interaction interface. Further, the user also has to know the position of a particular object in the interaction interface before operating it.

There is thus a problem with the conventional solution that the user cannot activate the interaction interface conveniently without knowing the position of the triggering control.

In addition, during a remote interaction between the user and the electronic device, in order to activate the interaction interface on the electronic device, the user needs to make a particular gesture, e.g., waving his/her hand. During a short-distance interaction between the user and the electronic device, in order to activate the interaction interface on the electronic device, the user needs to make another particular gesture, e.g., clicking an icon associated with the interaction interface on a touch screen. In this case, in order to enable the remote and short-distance interactions with the electronic device, the user has to memorize two different gestures. That is, when different gestures are required for activating different interaction interfaces, the user has to memorize these gestures, which is obviously inconvenient for the user. Further, for the electronic device, it is inefficient to invoke different processing mechanisms for different gestures.

There is thus also a problem with the conventional solution that different interaction gestures are required for the remote and short-distance interactions between the user and the electronic device.

SUMMARY

It is an object of the present disclosure to provide an information processing method and an electronic device, capable of solving the problem with the conventional solution that the user cannot activate the interaction interface conveniently without knowing the position of the triggering control and achieving an effect that the user can activate the interaction interface conveniently by performing an input operation that changes from a first attitude to a second attitude. It is also an object of the present disclosure to provide an information processing method and an electronic device, capable of solving the problem with the conventional solution that different interaction gestures are required for the remote and short-distance interactions between the user and the electronic device and achieving an effect that the same interaction can be accomplished by one and the same gesture for both the remote and short-distance interactions.

In an aspect, an information processing method is provided. The method is applied in an electronic device comprising a display unit and a sensing unit. The method comprises steps of: obtaining at least one sensed parameter of an operator using the sensing unit; determining a parameter change of the operator based on the at least one sensed parameter; judging, based on the parameter change, whether an input action of the operator satisfies a first predetermined condition, so as to obtain a first judgment result, the first predetermined condition being satisfied when the operator changes from a first attitude to a second attitude different from the first attitude; determining the input action of the operator as a first input action and determining a mapped position of the operator on the display unit based on the parameter change, when the first judgment result indicates that the input action satisfies the first predetermined condition; determining a first control instruction associated with the first input action; and displaying a first graphic interaction interface at the mapped position in response to the first control instruction.

Alternatively, the sensing unit comprises a remote interaction sensing unit and/or a touch interaction sensing unit, the remote interaction sensing unit having a capture space in front of the display unit, and the step of obtaining at least one sensed parameter of the operator using the sensing unit comprises a step of: obtaining the at least one sensed parameter of the operator using the remote interaction sensing unit and/or the touch interaction sensing unit.

Alternatively, the step of obtaining the at least one sensed parameter of the operator using the remote interaction sensing unit and/or the touch interaction sensing unit comprises steps of: obtaining at least one first sensed parameter using the remote interaction sensing unit; and/or obtaining at least one second sensed parameter using the touch interaction sensing unit.

Alternatively, the step of determining the parameter change of the operator based on the at least one sensed parameter comprises steps of: determining a first processing mechanism associated with the remote interaction sensing unit, and determining a parameter change of the at least one first sensed parameter based on the first processing mechanism; and/or determining a second processing mechanism associated with the touch interaction sensing unit, the second processing mechanism being different from the first processing mechanism, and determining a parameter change of the at least one second sensed parameter based on the second processing mechanism.

Alternatively, the step of determining the input action of the operator as the first input action and determining the mapped position of the operator on the display unit based on the parameter change comprises steps of: determining the input action of the operator as the first input action, when the first judgment result as obtained based on the parameter change of the at least one first sensed parameter and/or the parameter change of the at least one second sensed parameter indicates that the input action satisfies the first predetermined condition; and determining the mapped position based on a first parameter, which is a changed first sensed parameter, and/or a second parameter, which is a changed second sensed parameter.

Alternatively, the method further comprises a step of: determining to invoke the first processing mechanism when a distance between the operator and the display unit exceeds a threshold.

Alternatively, the at least one first sensed parameter is obtained from M images of the operator as captured by the remote interaction sensing unit in real time, where M is an integer equal to or larger than 2.

Alternatively, the method further comprises, subsequent to the step of determining the first control instruction associated with the first input action and displaying the first graphic interaction interface at the mapped position in response to the first control instruction, steps of: judging whether the input action satisfies a second predetermined condition, so as to obtain a second judgment result, the second predetermined condition being satisfied when the operator changes from the first attitude to the second attitude different from the first attitude and moves in the second attitude; determining the input action as a second input action when the second judgment result indicates that the input action satisfies the second predetermined condition; and generating a second control instruction based on the first graphic interaction interface and a movement parameter of the second input action and displaying, in response to the second control instruction, a second graphic interaction interface at the mapped position.

Alternatively, the method further comprises, subsequent to the steps of determining the first control instruction associated with the first input action and displaying the first graphic interaction interface at the mapped position in response to the first control instruction, steps of: judging whether the input action satisfies a third predetermined condition, so as to obtain a third judgment result, the third predetermined condition being satisfied when the operator changes from the second attitude to the first attitude or maintains the second attitude for at least a predetermined time period; determining the input action as a third input action when the third judgment result indicates that the input action satisfies the third predetermined condition; and generating a third control instruction based on the third input action and hiding, in response to the third control instruction, the first graphic interaction interface.

Alternatively, when the first graphic interaction interface contains N data objects, where N is a positive integer, the steps of generating the second control instruction based on the first graphic interaction interface and the movement parameter of the second input action and displaying, in response to the second control instruction, the second graphic interaction interface at the mapped position comprises steps of: obtaining a movement trajectory of the second input action; determining a movement direction of the movement trajectory as a first movement direction and determining the first movement direction as the movement parameter; determining a first data object out of the N data objects that corresponds to the first movement direction based on the movement parameter; and determining the second control instruction based on the first data object.

Alternatively, the display unit is capable of displaying a dynamic image of the operator as captured by the remote interaction sensing unit or mirroring a first virtual image of the operator.

Alternatively, the dynamic image or the first virtual image indicates an operation position of the operator on the display unit, the operation position corresponding to the mapped position.

In another aspect, an electronic device is provided. The electronic device comprises a display unit and a sensing unit. The electronic device further comprises: a first obtaining unit configured to obtain at least one sensed parameter of an operator using the sensing unit; a first determining unit configured to determine a parameter change of the operator based on the at least one sensed parameter; a first judging unit configured to judge, based on the parameter change, whether an input action of the operator satisfies a first predetermined condition, so as to obtain a first judgment result, the first predetermined condition being satisfied when the operator changes from a first attitude to a second attitude different from the first attitude; a second determining unit configured to determine the input action of the operator as a first input action and determine a mapped position of the operator on the display unit based on the parameter change, when the first judgment result indicates that the input action satisfies the first predetermined condition; a third determining unit configured to determine a first control instruction associated with the first input action; and a first responding unit configured to display a first graphic interaction interface at the mapped position in response to the first control instruction.

Alternatively, the sensing unit comprises a remote interaction sensing unit and/or a touch interaction sensing unit, the remote interaction sensing unit having a capture space in front of the display unit, and the first obtaining unit is configured to obtain the at least one sensed parameter of the operator using the remote interaction sensing unit and/or the touch interaction sensing unit.

Alternatively, the first obtaining unit is configured to: obtain at least one first sensed parameter using the remote interaction sensing unit; and/or obtain at least one second sensed parameter using the touch interaction sensing unit.

Alternatively, the first determining unit is configured to: determine a first processing mechanism associated with the remote interaction sensing unit, and determine a parameter change of the at least one first sensed parameter based on the first processing mechanism; and/or determine a second processing mechanism associated with the touch interaction sensing unit, the second processing mechanism being different from the first processing mechanism, and determine a parameter change of the at least one second sensed parameter based on the second processing mechanism.

Alternatively, the second determining unit is configured to: determine the input action of the operator as the first input action when the first judgment result as obtained based on the parameter change of the at least one first sensed parameter and/or the parameter change of the at least one second sensed parameter indicates that the input action satisfies the first predetermined condition; and determine the mapped position based on a first parameter, which is a changed first sensed parameter, and/or a second parameter, which is a changed second sensed parameter.

Alternatively, the first processing mechanism is determined to be invoked when a distance between the operator and the display unit exceeds a threshold.

Alternatively, the at least one first sensed parameter is obtained from M images of the operator as captured by the remote interaction sensing unit in real time, where M is an integer equal to or larger than 2.

Alternatively, the electronic device further comprises: a second judging unit configured to judge whether the input action satisfies a second predetermined condition, so as to obtain a second judgment result, the second predetermined condition being satisfied when the operator changes from the first attitude to the second attitude different from the first attitude and moves in the second attitude; a fourth determining unit configured to determine the input action as a second input action when the second judgment result indicates that the input action satisfies the second predetermined condition; and a second responding unit configured to generate a second control instruction based on the first graphic interaction interface and a movement parameter of the second input action and display, in response to the second control instruction, a second graphic interaction interface at the mapped position.

Alternatively, the electronic device further comprises: a third judging unit configured to judge whether the input action satisfies a third predetermined condition, so as to obtain a third judgment result, the third predetermined condition being satisfied when the operator changes from the second attitude to the first attitude or maintains the second attitude for at least a predetermined time period; a fifth determining unit configured to determine the input action as a third input action when the third judgment result indicates that the input action satisfies the third predetermined condition; and a third responding unit configured to generate a third control instruction based on the third input action and hide, in response to the third control instruction, the first graphic interaction interface.

Alternatively, when the first graphic interaction interface contains N data objects, where N is a positive integer, the second responding unit is configured to: obtain a movement trajectory of the second input action; determine a movement direction of the movement trajectory as a first movement direction and determine the first movement direction as the movement parameter; determine a first data object out of the N data objects that corresponds to the first movement direction based on the movement parameter; and determine the second control instruction based on the first data object.

Alternatively, the display unit is capable of displaying a dynamic image of the operator as captured by the remote interaction sensing unit or mirroring a first virtual image of the operator.

Alternatively, the dynamic image or the first virtual image indicates an operation position of the operator on the display unit, the operation position corresponding to the mapped position.

In yet another aspect, an information processing method is provided. The method is applied in an electronic device comprising a display unit, a remote interaction sensing unit and a touch interaction sensing unit. The remote interaction sensing unit has a capture space in front of the display unit. The method comprises: obtaining at least one sensed parameter of an operator by the remote interaction sensing unit applying a first processing mechanism and/or by the touch interaction sensing unit applying a second processing mechanism; determining an input action of the operator and a mapped position of the operator on the display unit based on the at least one sensed parameter; determining a control instruction associated with the input action; and displaying a graphic interaction interface at the mapped position in response to the control instruction.

One or more of the above solutions according to the embodiments of the present disclosure have at least one or more of the following technical effects.

In the solutions according to the present disclosure, at least one sensed parameter of the operator is obtained first using the sensing unit. A parameter change of the operator is determined based on the at least one sensed parameter. It is judged, based on the parameter change, whether an input action of the operator satisfies a first predetermined condition, so as to obtain a first judgment result. Here, the first predetermined condition is satisfied when the operator changes from a first attitude to a second attitude different from the first attitude. When the first judgment result indicates that the input action satisfies the first predetermined condition, the input action of the operator is determined as a first input action and a mapped position of the operator on the display unit is determined based on the parameter change. A first control instruction associated with the first input action is determined. Finally, a first graphic interaction interface is displayed at the mapped position in response to the first control instruction. In this way, it is possible to solve the problem with the conventional solution that the user cannot activate the interaction interface conveniently without knowing the position of the triggering control and to achieve an effect of improved user convenience since the first graphic interaction interface can be displayed at the mapped position when the input action changes from the first attitude to the second attitude.

Furthermore, a remote interaction sensing unit and/or a touch interaction sensing unit can be used to obtain sensed parameters of the operator and the subsequent processes can be carried out based on the sensed parameters. In this way, it is possible to solve the problem with the conventional solution that different interaction gestures are required for the remote and short-distance interactions between the user and the electronic device and to achieve an effect that the user of the electronic device can instruct the electronic device to display the first graphic interaction interface at the mapped position by performing one and the same input operation, regardless of whether the user interacts with the electronic device remotely or in a short distance.

DETAILED DESCRIPTION OF THE EMBODIMENTS

Figure 1:
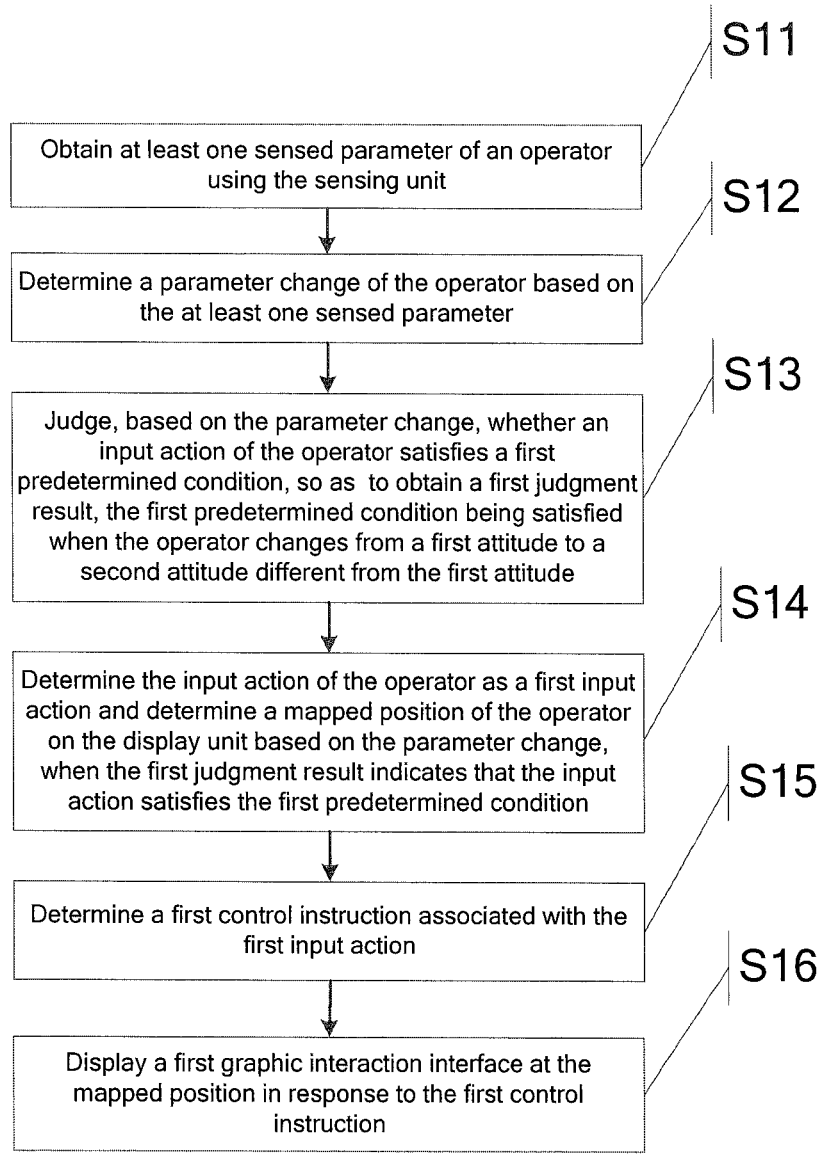
FIG. 1 is a flowchart illustrating an information processing method according to an exemplary embodiment of the present disclosure.

The present disclosure provides an information processing method and an electronic device, capable of solving the problem with the conventional solution that the user cannot activate the interaction interface conveniently without knowing the position of the triggering control and achieving an effect that the user can activate the interaction interface conveniently by performing an input operation that changes from a first attitude to a second attitude. The present disclosure also provides an information processing method and an electronic device, capable of solving the problem with the conventional solution that different interaction gestures are required for the remote and short-distance interactions between the user and the electronic device and achieving an effect that the same interaction can be accomplished by one and the same gesture for both the remote and short-distance interactions.

In order to solve the above problems, a general concept of the solutions according to the embodiments of the present disclosure is as follows. At least one sensed parameter of an operator is obtained firstly using a sensing unit. A parameter change of the operator is determined based on the at least one sensed parameter. It is judged, based on the parameter change, whether an input action of the operator satisfies a first predetermined condition, so as to obtain a first judgment result. Here, the first predetermined condition is satisfied when the operator changes from a first attitude to a second attitude different from the first attitude. When the first judgment result indicates that the input action satisfies the first predetermined condition, the input action of the operator is determined as a first input action and a mapped position of the operator on the display unit is determined based on the parameter change. A first control instruction associated with the first input action is determined. A first graphic interaction interface is displayed at the mapped position in response to the first control instruction.

In the solutions according to the present disclosure, at least one sensed parameter of the operator is obtained firstly using the sensing unit. A parameter change of the operator is determined based on the at least one sensed parameter. It is judged, based on the parameter change, whether an input action of the operator satisfies a first predetermined condition, so as to obtain a first judgment result. Here, the first predetermined condition is satisfied when the operator changes from a first attitude to a second attitude different from the first attitude. When the first judgment result indicates that the input action satisfies the first predetermined condition, the input action of the operator is determined as a first input action and a mapped position of the operator on the display unit is determined based on the parameter change. A first control instruction associated with the first input action is determined. Finally, a first graphic interaction interface is displayed at the mapped position in response to the first control instruction. In this way, it is possible to solve the problem with the conventional solution that the user cannot activate the interaction interface conveniently without knowing the position of the triggering control and to achieve an effect of improved user convenience since the first graphic interaction interface can be displayed at the mapped position when the input action changes from the first attitude to the second attitude.

The sensing unit may include a remote interaction sensing unit and/or a touch interaction sensing unit. The at least one sensed parameter can be obtained by using the remote interaction sensing unit and/or the touch interaction sensing unit, and the subsequent processes can be carried out based on the sensed parameters obtained using the remote interaction sensing unit and/or the touch interaction sensing unit. In this way, it is possible to solve the problem with the conventional solution that different interaction gestures are required for the remote and short-distance interactions between the user and the electronic device and to achieve an effect that the user of the electronic device can instruct the electronic device to display the first graphic interaction interface at the mapped position by performing one and the same input operation, regardless of whether the user interacts with the electronic device remotely or in a short distance.

In the following, the solutions of the present disclosure will be described in detail with reference to the figures and the embodiments. It should be noted that the embodiments of the present disclosure and their specific features are given for illustrating the solutions of the present disclosure and are not intended to limit the scope of the present disclosure. The embodiments of the present disclosure and their specific features can be combined with each other, provided that they do not conflict.

The embodiments of the present disclosure provide an information processing method and an electronic device. In an implementation, the electronic device can be a smart TV or a notebook or desktop computer having a display unit, a remote interaction sensing unit and a touch interaction sensing unit. The embodiments of the present disclosure are not limited to any specific electronic device. In the following, the information processing method and the electronic device according to the embodiments of the present disclosure will be described in detail in conjunction with an example in which the electronic device is a smart TV.

Example One

Figure 7:
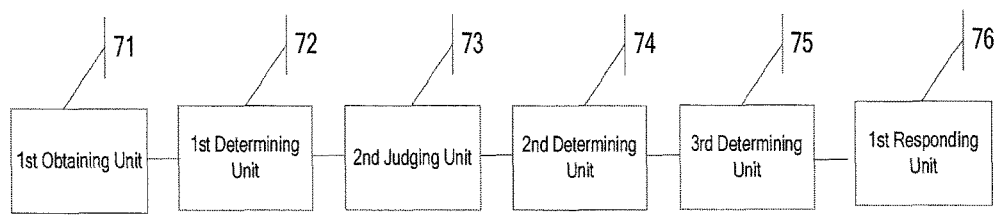
FIG. 7 is a schematic diagram showing a structure of an electronic device according to an exemplary embodiment of the present disclosure.

Before introducing the information processing method according to an embodiment of the present disclosure, the basic structure of an electronic device to which the method is applied will be described first. Referring to FIG. 7, the electronic device according to the embodiment of the present disclosure includes a display unit and a sensing unit. The electronic device further includes the following units.

A first obtaining unit 71, which is configured to obtain at least one sensed parameter of an operator using the sensing unit.

A first determining unit 72, which is configured to determine a parameter change of the operator based on the at least one sensed parameter.

A first judging unit 73, which is configured to judge, based on the parameter change, whether an input action of the operator satisfies a first predetermined condition, so as to obtain a first judgment result. The first predetermined condition is satisfied when the operator changes from a first attitude to a second attitude different from the first attitude.

A second determining unit 74, which is configured to determine the input action of the operator as a first input action and determine a mapped position of the operator on the display unit based on the parameter change, when the first judgment result indicates that the input action satisfies the first predetermined condition.

A third determining unit 75, which is configured to determine a first control instruction associated with the first input action.

A first responding unit 76, which is configured to display a first graphic interaction interface at the mapped position in response to the first control instruction.

Reference is now made to FIG. 1. The information processing method according to the exemplary embodiment of the present disclosure includes the following steps.

At step S11, at least one sensed parameter of an operator is obtained using the sensing unit.

In particular, in an embodiment of the present disclosure, the sensing unit can include a remote interaction sensing unit and/or a touch interaction sensing unit. The remote interaction sensing unit can be an image capture unit or a structured light capture unit. The touch interaction sensing unit can be a touch display unit, such as a resistive touch display unit, a capacitive touch display unit or a flexible display screen unit. The remote interaction sensing unit and/or the touch interaction sensing unit can be selected by those skilled in the art as desired and the present disclosure is not limited to this.

In an embodiment of the present disclosure, the operator can be a part of a user's body, e.g., a palm or an arm. The present disclosure is not limited to this. In the following, it is assumed that the operator is a user's palm as an example.

In an embodiment of the present disclosure, the at least one sensed parameter can be obtained by using the remote interaction sensing unit and/or the touch interaction sensing unit. Thus, in the embodiment of the present disclosure, the step S11 may include: obtaining at least one first sensed parameter using the remote interaction sensing unit; and/or obtaining at least one second sensed parameter using the touch interaction sensing unit.

In particular, in this embodiment of the present disclosure, at least one first sensed parameter can be obtained using the remote interaction sensing unit. The first sensed parameter may include an attitude of the operator, a position of the operator and a rate of change in the attitude of the operator.

Assuming that the remote interaction sensing unit is an image capture unit, the image capture unit may obtain the at least one first sensed parameter by capturing M images, where M is an integer equal to or larger than 2, e.g., 2, 3, 42 etc. The present disclosure is not limited to any specific value of M. The approach of determining the at least one first sensed parameter from the M images may be, e.g., identifying the attitude of the operator, the position of the operator and the rate of change in the attitude of the operator based on M (e.g., 4) frames of images or a captured dynamic video. The approaches for determining actions and related parameters of the operator in an image based on the image information are known in the art and the description thereof will thus be omitted here.

Further, in an embodiment of the present disclosure, at least one second sensed parameter may be obtained using the touch interaction sensing unit. The second sensed parameter may include an attitude of the operator, a position of the operator and a rate of change in the attitude of the operator etc.

Assuming that the touch interaction sensing unit is a touch display unit, when the user touches the touch display unit by the operator, e.g., his/her palm or finger, the touch display unit can detect the attitude of the operator, the position of the operator and the rate of change in the attitude of the operator etc. on the touch display unit. The approaches for determining actions and related parameters of the operator based on touches are known in the art and the description thereof will thus be omitted here.

Further, in an embodiment of the present disclosure, the electronic device may simultaneously obtain at least one first sensed parameter by using the remote interaction sensing unit and at least one second sensed parameter by using the touch interaction sensing unit. That is, the remote interaction sensing unit and the touch interaction sensing unit may simultaneously obtain the at least one sensed parameter. For example, when the operator, e.g., the user's palm, operates on the touch display unit, the touch display unit may detect the at least one second sensed parameter associated with the touch operation by the user's palm on the touch display unit, while an image capture unit located at an edge of the touch display unit may capture M images of the user's palm to obtain the at least one first sensed parameter.

Next, the method proceeds to step S12.

At step S12, a parameter change of the operator is determined based on the at least one sensed parameter.

In an embodiment of the present disclosure, at least one (e.g., 1, 29 or 93) sensed parameter is obtained by the remote interaction sensing unit and/or the touch interaction sensing unit. Then, the electronic device may obtain a parameter change associated with the at least one sensed parameter and thus continuous changes of the input operation performed by the operator.

Further, in an embodiment of the present disclosure, the parameter change represents a change in attitude of the operator. That is, the input operation of the operator is a varying process, and the obtained parameter change exactly characterizes the process in which the operation changes from its initial attitude to its final attitude. Assuming that the operator is the user's hand, its initial attitude may be the user clenching his/her fist and its final attitude may be the user opening his/her palm. Alternatively, the initial attitude may be the user clenching his/her fist and the final attitude may be the user stretching out one of the fingers and keeping the other four fingers unchanged. The attitudes can be selected by those skilled in the art as desired and the present disclosure is not limited to this.

Since the at least one sensed parameter may be obtained using the remote interaction sensing unit and/or the touch interaction sensing unit according to the embodiments of the present disclosure, the process of obtaining the parameter change based on the first sensed parameter and/or the second sensed parameter will be described as follows.

(1) Remote Interaction Sensing Unit

After the at least one first sensed parameter is obtained using the remote interaction sensing unit, the following steps may be performed in order to obtain the parameter change of the first sensed parameter.

1) A first processing mechanism associated with the remote interaction sensing unit is determined.

2) A parameter change of the at least one first sensed parameter is determined based on the first processing mechanism.

First, in an embodiment of the present disclosure, when the first sensed parameter is obtained using the remote interaction sensing unit, e.g., the image capture unit, the electronic device will determine the first processing mechanism associated with the remote interaction sensing unit.

In particular, since M images are obtained by the image capture unit, in order to process the at least one first sensed parameter and thus obtain the parameter change, the first processing mechanism capable of recognizing and processing the at least one first sensed parameter needs to be invoked. The first processing mechanism may be a particular segment of program in the electronic device, a processing plug-in based on the remote interaction sensing unit, or a piece of dedicated interaction software. The present disclosure is not limited to any specific first processing mechanism.

Figure 2:
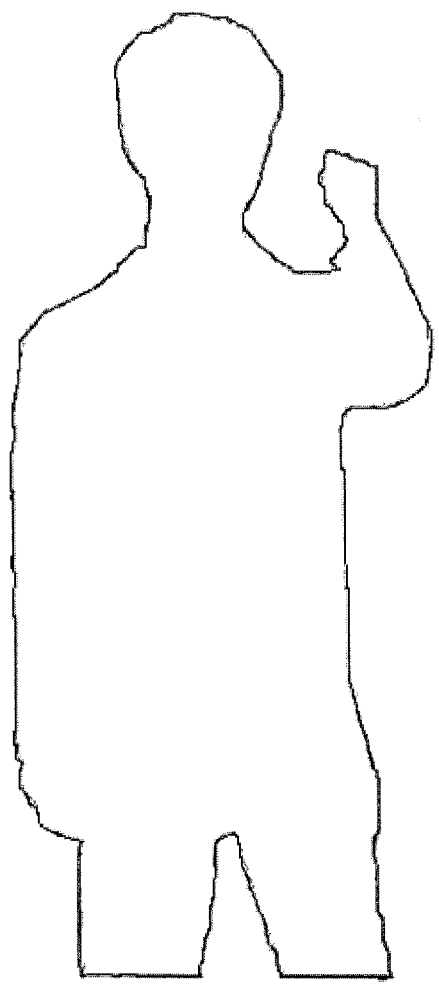
FIG. 2 is a schematic diagram showing a first attitude according to the exemplary embodiment of the present disclosure.
Figure 3:
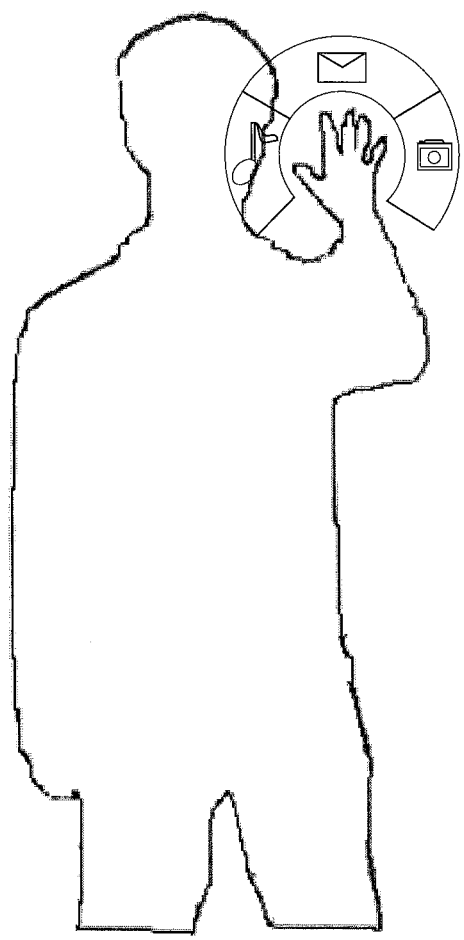
FIG. 3 is a schematic diagram showing a second attitude and a first graphic interaction interface according to the exemplary embodiment of the present disclosure.

Assuming, in an embodiment of the present disclosure, that the remote interaction sensing unit is an image capture unit and M is 3, first image information obtained by the image capture unit is shown in FIG. 2, in which the operator is the user's palm. The first sensed parameter may be obtained from the first image information, e.g., the position of the operator as shown is a first position and the attitude of the operator is a clenched fist. It is assumed that second image information shows that the position of the operator is still the first position and the attitude of the operator is a half-opened fist. It is further assumed that third image information shows that the position of the operator is still the first position and the attitude of the operator is an opened palm, as shown in FIG. 3. Then, the first processing mechanism is initiated for processing the above three first sensed parameters, so as to determine that the parameter change process of the first sensed parameter is a change process in which the operator changes from a first attitude, i.e., a clenched fist, to a second attitude, i.e., an opened palm, at the first position.

(2) Touch Interaction Sensing Unit

After obtaining the at least one second sensed parameter using the touch interaction sensing unit, the following steps may be performed, in order to obtain the parameter change of the second sensed parameter.

1) A second processing mechanism associated with the touch interaction sensing unit is determined. The second processing mechanism is different from the first processing mechanism.

2) A parameter change of the at least one second sensed parameter is determined based on the second processing mechanism.

First, in an embodiment of the present disclosure, when the second sensed parameter is obtained using the touch interaction sensing unit, e.g., a touch display unit, the electronic device will firstly determine a second processing mechanism associated with the touch interaction sensing unit.

In particular, since the at least one second sensed parameter is obtained using the touch display unit, in order to process the at least one second sensed parameter and thus obtain the parameter change, the second processing mechanism capable of recognizing and processing the at least one second sensed parameter needs to be invoked. Although both the first and second sensed parameters are associated with the same input operation by the operator, the first and second sensed parameters are not completely identical to the each other. Thus, in an embodiment of the present disclosure, the first processing mechanism is different from the second processing mechanism. Further, the second processing mechanism may be a particular segment of program in the electronic device, a processing plug-in based on the touch interaction sensing unit, or a piece of dedicated interaction software. The present disclosure is not limited to any specific second processing mechanism.

Assuming, in an embodiment of the present disclosure, that the touch interaction sensing unit is a touch display unit and the operator is the user's palm, it is determined by analyzing a $1^{st}$ second sensed parameter obtained by the touch display unit that the position of the operator as shown is a first position and the attitude of the operator is a clenched fist. It is assumed that, by analyzing a $2^{nd}$ second sensed parameter, it is determined that the position of the operator is still the first position and the attitude of the operator is a half-opened fist. It is further assumed that, by analyzing a $3^{rd}$ second sensed parameter, it is determined that the position of the operator is still the first position and the attitude of the operator is an opened palm. Then, the second processing mechanism is initiated for processing the above three second sensed parameters, so as to determine that the parameter change process of the second sensed parameter is a varying process in which the operator changes from an initial attitude, i.e., a clenched fist, to a final attitude, i.e., an opened palm, at the first position.

Of course, since in an embodiment of the present disclosure that each of the remote interaction sensing unit and the touch interaction sensing unit may be used to obtain the at least one sensed parameter, the at least one first sensed parameter and the at least one second sensed parameter may be combined to determine the parameter change. For example, it may be determined from the above three image information and three touch information that the parameter change process of the second sensed parameter is a varying process in which the operator changes from an initial attitude, i.e., a clenched fist, to a final attitude, i.e., an opened palm, at the first position.

After the parameter change is determined, the method proceeds to step S13.

At step S13, it is judged, based on the parameter change, whether an input action of the operator satisfies a first predetermined condition, so as to obtain a first judgment result.

After the parameter change of the operator has been determined at the step S12, it is then judged whether an input action of the operator satisfies a first predetermined condition. In particular, in an embodiment of the present disclosure, the first predetermined condition is satisfied when the operator changes from a first attitude to a second attitude different from the first attitude. Assuming that the operator is the user's hand, for example, the first attitude may be the user clenching his/her first and the second attitude may be the user opening his/her palm. Alternatively, the first attitude may be the user clenching his/her first and the second attitude may be the user stretching out one of the fingers and keeping the other four fingers unchanged. The attitudes may be selected by those skilled in the art as desired and the present disclosure is not limited to this.

Since at least one sensed parameter may be obtained using the remote interaction sensing unit and/or the touch interaction sensing unit according to the embodiments of the present disclosure, in the step S13, the process of judging, based on the parameter change, whether the input action of the operator satisfies the first predetermined condition so as to obtain the first judgment result includes:

(1) judging, when the at least one first sensed parameter is obtained using the remote interaction sensing unit, whether the input action of the operator satisfies the first predetermined condition based on the parameter change of the first sensed parameter to obtain the first judgment result; and/or (2) judging, when the at least one second sensed parameter is obtained using the touch interaction sensing unit, whether the input action of the operator satisfies the first predetermined condition based on the parameter change of the second sensed parameter to obtain the first judgment result.

Next, the method proceeds to step S14.

At step S14, when the first judgment result indicates that the input action satisfies the first predetermined condition, the input action of the operator is determined as a first input action and a mapped position of the operator on the display unit is determined based on the parameter change.

Since at least one sensed parameter may be obtained using the remote interaction sensing unit and/or the touch interaction sensing unit according to the embodiments of the present disclosure, the process of determining the input action of the operator as the first input action and determining the mapped position of the operator on the display unit based on the parameter change when the first judgment result indicates that the input action satisfies the first predetermined condition will be detailed below.

(1) When the at least one first sensed parameter is obtained using the remote interaction sensing unit, the step S14 may include the following operations.

1) When the first judgment result as obtained based on the parameter change of the at least one first sensed parameter indicates that the input action satisfies the first predetermined condition, the input action of the operator is determined as the first input action.

2) The mapped position is determined based on a first parameter, which is a changed first sensed parameter.

In particular, when the change in the at least one first sensed parameter satisfies the first predetermined condition, the input action of the operator is determined as the first input action. Here, the first predetermined condition is satisfied when the operator changes from the first attitude to the second attitude.

Assuming that the first attitude is a clenched first and the second attitude is an opened palm, the first judgment result is YES when the user's palm as the operator satisfies the first predetermined condition. When the first attitude of the operator is a clenched first but the second attitude is the user stretching out one of the fingers and keeping the other four fingers unchanged, the user's second attitude does not satisfy the condition of an opened palm and thus the input action by the user does not satisfy the first predetermined condition. When the first attitude of the operator is the user stretching out one of the fingers and keeping the other four fingers unchanged and the second attitude is an opened palm, the first attitude does not satisfy the condition of a clenched first and thus the input action by the user does not satisfy the first predetermined condition.

When the input action satisfies the first predetermined condition, the input action is determined as the first input action.

Further, the mapped position of the operator may be determined based on a first parameter, which is a changed first sensed parameter, i.e., the last one of the at least one first sensed parameter or the first parameter after the change stops. The mapped position of the operator is dependent on the mapping relation between the actual position and the mapped position of the operator.

In an embodiment of the present disclosure, the display unit of the electronic device is capable of displaying a dynamic image of the operator as captured by the image capture unit or mirroring a first virtual image of the operator. The dynamic image or the first virtual image indicates an operation position of the operator on the display unit. The operation position corresponds to the mapped position.

For the purpose of introduction of the present disclosure, it is assumed in an embodiment that the mapping relation is a front projection relation. In particular, after an image is captured by the remote interaction sensing unit, e.g., an image capture unit, it may be displayed on the display unit. That is, the operator is projected frontally onto the display unit at the mapped position. As shown in FIG. 2, it is assumed that the mapped position is the position of the user's clenched first in the image of the user's body. Alternatively, when the display unit is a mirror display screen, it may present a first virtual image of the operator. That is, the operator is projected frontally onto the surface of the display unit at the mapped position. As shown in FIG. 2, it is assumed that the mapped position is the position of the user's clenched first in the image of the user's body.

(2) When the at least one first sensed parameter is obtained using the touch interaction sensing unit, the step S14 may include the following operations.

1) When the first judgment result as obtained based on the parameter change of the at least one second sensed parameter indicates that the input action satisfies the first predetermined condition, the input action of the operator is determined as the first input action.

2) The mapped position is determined based on a second parameter, which is a changed second sensed parameter.

In particular, when the change in the at least one second sensed parameter satisfies the first predetermined condition, the input action of the operator is determined as the first input action. Here, the first predetermined condition is satisfied when the operator changes from the first attitude to the second attitude.

Assuming that the first attitude is a clenched first and the second attitude is an opened palm, the first judgment result is YES when the user's palm as the operator satisfies the first predetermined condition. When the first attitude of the operator is a clenched first but the second attitude is the user stretching out one of the fingers and keeping the other four fingers unchanged, the user's second attitude does not satisfy the condition of an opened palm and thus the input action by the user does not satisfy the first predetermined condition. When the first attitude of the operator is the user stretching out one of the fingers and keeping the other four fingers unchanged and the second attitude is an opened palm, the first attitude does not satisfy the condition of a clenched first and thus the input action by the user does not satisfy the first predetermined condition.

When the input action satisfies the first predetermined condition, the input action is determined as the first input action.

Further, since the operator interacts with the electronic device via the touch interaction sensing unit, e.g., a touch display unit, the touch position may be determined as the mapped position directly. Alternatively, the mapped position may be determined dependent on a particular mapping relation. For example, in the touch interaction sensing unit, the user touchable area is a rectangular area having a width of 3 cm and a length of 5 cm and the display unit is a rectangular area having a width of 30 cm and a length of 50 cm. The lower left corner of the touch area is considered as an origin of a touch coordinate system and the lower left corner of the display area is considered as an origin of the display coordinate system. When the touch interaction sensing unit detects a first position at (1 cm, 1 cm), assuming a mapping relation of 1:10, the mapped position of the operator on the display unit is then (10 cm, 10 cm). Further examples will be omitted here.

Of course, since in an embodiment of the present disclosure that each of the remote interaction sensing unit and the touch interaction sensing unit may be used to obtain at least one sensed parameter, when the parameter change is determined, the first input action and the mapped position may be determined based on the parameter change of the first sensed parameter and the parameter change of the second sensed parameter. For example, based on the above first predetermined condition and mapping relation, the first input action may be determined and the mapped position on the display unit may be determined, e.g., the position as shown in FIG. 3.

Next, the method proceeds to step S15.

At step S15, a first control instruction associated with the first input action is determined.

When the electronic device determines the input action by the user as the first input action, the first input action is associated with an instruction for the electronic device. According to the present disclosure, there are various approaches for obtaining the instruction associated with the first input action. For example, the electronic device may search an instruction table in a memory for the instruction associated with the first input action and then generates the found instruction. Alternatively, the first input action may be a triggering operation and, when it is recognized, it triggers the electronic device directly to generate and execute a first control instruction. In practice, the approach for obtaining the instruction may be to selected by those skilled in the art as desired and the present disclosure is not limited to this.

Next, the method proceeds to step S16.

At step S16, a first graphic interaction interface is displayed at the mapped position in response to the first control instruction.

In particular, in an embodiment of the present disclosure, the first control instruction is to control the display unit to display the first graphic interaction interface at the mapped position. Here, the first graphic interaction interface may be circular, rectangular or annular. The shape of the first graphic interaction interface may be selected by those skilled in the art as desired and the present disclosure is not limited to this. It is assumed in an embodiment of the present disclosure that the first graphic interaction interface is a curved interaction interface, as shown in FIG. 3. Further, in order to provide an improved user convenience, in an embodiment of the present disclosure, the first graphic interaction interface is displayed at the mapped position, as shown in FIG. 3. In this way, the user may view the first graphic interaction interface very clearly.

It may be appreciated by those skilled in the art that, while the first graphic interaction interface is displayed at the mapped position, the operation position (i.e., the mapped position) of the operator on the display unit as indicated by the dynamic image displayed on the display unit or the first virtual image mirrored by the display unit is not necessarily located on the first graphic interaction interface displayed at the mapped position, but may be located near or at the edge of the first graphic interaction interface, such that the first graphic interaction interface may be clearly viewed and not shielded by the operation position (i.e., the mapped position) of the operator.

In the solutions according to the present disclosure, a sensed parameter of the operator is obtained first using the remote interaction sensing unit and/or the touch interaction sensing unit. A parameter change of the operator is determined based on the sensed parameter. It is then judged, based on the parameter change, whether an input action of the operator satisfies a first predetermined condition, so as to obtain a first judgment result. Here the first predetermined condition is satisfied when the operator changes from a first attitude to a second attitude different from the first attitude. When the first judgment result indicates that the input action satisfies the first predetermined condition, the input action of the operator is determined as a first input action and a mapped position of the operator on the display unit is determined based on the parameter change. Finally, a first control instruction associated with the first input action is determined. And a first graphic interaction interface is displayed at the mapped position in response to the first control instruction. In this way, it is possible to solve the problems with the conventional solution that the user cannot activate the interaction interface conveniently without knowing the position of the triggering control and that different interaction gestures are required for the remote and short-distance interactions between the user and the electronic device. It is possible to achieve an effect that the user may activate the interaction interface conveniently by performing an input operation that changes from a first attitude to a second attitude. It is also possible to achieve an effect that the user of the electronic device may instruct the electronic device to display the first graphic interaction interface at the mapped position by performing one and the same input operation, regardless of whether the user interacts with the electronic device remotely or in a short distance.

Further, in an embodiment of the present disclosure, the first processing mechanism is determined to be invoked when a distance between the operator and the display unit exceeds a threshold.

In particular, in an embodiment of the present disclosure, when the distance between the operator and the display unit exceeds a threshold, it is possible that the operator cannot touch the touch interaction sensing unit, or the remote interaction sensing unit, e.g., an image capture unit, may detect both the user and the operator simultaneously. In this case, it is determined to invoke the first processing mechanism. That is, it is unnecessary to invoke a second processing mechanism associated with the touch interaction sensing unit, which thus leads to an improved processing efficiency of the electronic device.

The threshold may be set by the user depending on his/her custom and requirements, e.g., to 50 cm or 60 cm etc. Alternatively, the threshold may be a default value set in the electronic device, e.g., 50 cm or 60 cm etc. The value of the threshold may be selected by those skilled in the art as desired and the present disclosure is not limited to this.

Figure 4:
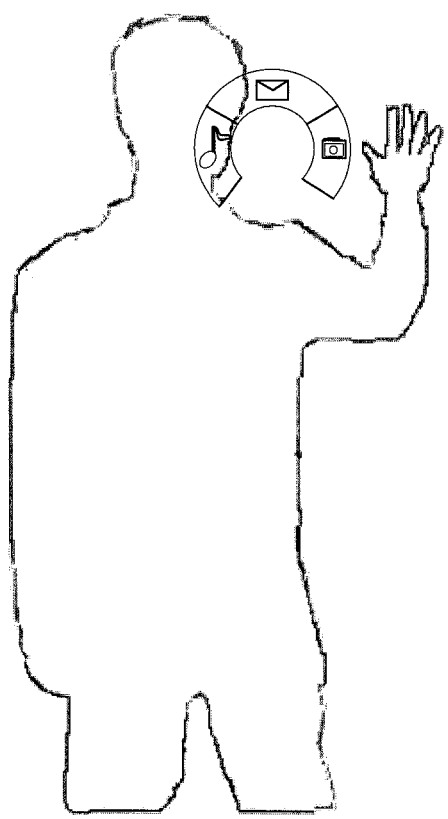
FIG. 4 is a schematic diagram showing a second input operation according to the exemplary embodiment of the present disclosure.

Further, in an embodiment of the present disclosure, after the first graphic interaction interface has been displayed at the mapped position, the user may want to operate on the first graphic interaction interface. As shown in FIG. 4, the user may operate a camera icon on the right of the curved interaction interface to take a photo. In this case, an embodiment of the present disclosure further includes the following steps.

(1) It is judged whether the input action satisfies a second predetermined condition, so as to obtain a second judgment result. The second predetermined condition is satisfied when the operator changes from the first attitude to the second attitude different from the first attitude and moves in the second attitude.

In an embodiment of the present disclosure, after it is judged that the input action satisfies the first predetermined condition, it may be further judged whether the input action satisfies the second predetermined condition. In particular, the second predetermined condition is satisfied when the operator changes from the first attitude to the second attitude different from the first attitude and moves in the second attitude, e.g., from left to right or from top to bottom. As long as the operator moves while maintaining the second attitude, the embodiment of the present disclosure is not limited to any specific movement direction or movement distance.

Next, a step (2) is performed.

(2) When the second judgment result indicates that the input action satisfies the second predetermined condition, the input action is determined as a second input action.

In particular, in an embodiment of the present disclosure, when the operator changes from the first attitude to the second attitude different from the first attitude and moves in the second attitude, it is determined that the input action satisfies the second predetermined condition, i.e., the second judgment result is YES. For example, when the first attitude is the operator stretching out one of the fingers and bending the other four fingers towards the center of the palm and the operator moves from top to bottom while maintaining the second attitude, the input action satisfies the second predetermined condition. As shown in FIG. 3 and FIG. 4, when the second attitude is an opened palm and the operator moves from the position shown in FIG. 3 to the right to the position shown in FIG. 4, the second judgment result is YES. If the operator does not maintain the second attitude while moving, it is judged that the input action does not satisfy the second predetermined condition.

When the input action satisfies the second predetermined condition, the input action is determined as a second input action.

Next, a step (3) is performed.

(3) A second control instruction is generated based on the first graphic interaction interface and a movement parameter of the second input action and, in response to the second control instruction, a second graphic interaction interface is displayed at the mapped position.

In an embodiment of the present disclosure, after determining the input action by the operator as the second input action, the electronic device may generate a second control instruction based on the first graphic interaction interface and a movement parameter of the second input action and, in response to the second control instruction, display a second graphic interaction interface at the mapped position.

In particular, in the step (3), the process of generating and responding to the second control instruction based on the first graphic interaction interface and the movement parameter of the second input action includes the following operations.

1) A movement trajectory of the second input action is obtained.

2) A movement direction of the movement trajectory is determined as a first movement direction and the first movement direction is determined as the movement parameter.

3) A first data object out of the N data objects that corresponds to the first movement direction is determined based on the movement parameter.

4) The second control instruction is determined based on the first data object.

Figures 5A, 5B:
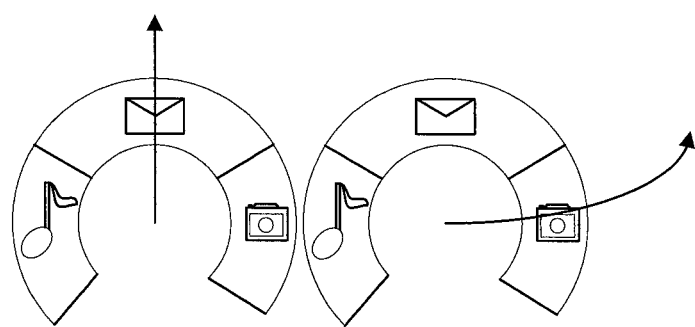
FIGS. 5A and 5B are schematic diagrams showing a first graphic interaction interface and a movement trajectory according to an exemplary embodiment of the present disclosure.

In particular, in an embodiment of the present disclosure, the first graphic interaction interface contains N data objects, such as photo, message, video, game, calendar and the like, where N is a positive integer such as 2, 13 and 4 etc. The present disclosure is not limited to any specific data object or any specific value of N. In the following, N is assumed to be 3 for example. FIGS. 5A and 5B shows three data objects contained in the first graphic interaction interface: "music", "message" and "camera" (from left to right).

First, the movement trajectory of the second input action is obtained, which may be a straight line as shown in FIG. 5A or a curve as shown in FIG. 5B. As long as the trajectory may represent the movement of the second input action by the operator, it may be selected by those skilled in the art as desired and the present disclosure is not limited to this.

In an embodiment of the present disclosure, the movement trajectory of the second input action may be obtained by using the remote interaction sensing unit, the touch interaction sensing unit, or both.

Assuming that the remote interaction sensing unit is an image capture unit, the movement trajectory of the second input action may be obtained from M images captured by the image capture unit. Assuming that the touch interaction sensing unit is a touch display unit, the movement trajectory of the second input action may be obtained by the touch display unit.

Then, the movement direction of the movement trajectory is determined as a first movement direction, e.g., an outward direction from the center of the first graphic interaction interface, and the first movement direction is determined as the movement parameter. As shown in FIG. 5A, the first movement direction, which is an upward direction from the center of the first graphic interaction interface, is determined as the movement parameter. In FIG. 5B, the first movement direction, which is a leftward direction from the center of the first graphic interaction interface, is determined as the movement parameter. Of course, in practice the first movement direction includes, but not limited to, the above two scenarios in the embodiment of the disclosure with the increase of N and the variation of the first graphic interaction interface. For example, the first movement direction may be a direction forming an angle of 30° with the vertical line in the first graphic interaction interface.

Then, a first data object that corresponds to the first movement direction is determined based on the movement parameter, i.e., the first movement direction. In particular, one of the N data objects that the first movement direction is pointed to is determined as the first data object. For example, in FIG. 5A, the first movement direction is pointed to the data object "message", which is determined as the first data object.

Figure 6A:
FIGS. 6A and 6B are schematic diagrams showing a second graphic interaction interface according to an exemplary embodiment of the present disclosure.
Figure 6B:

Finally, after the first data object has been determined, the second control instruction is determined based on the first data object. In particular, the second control instruction is to activate a second graphic interaction interface associated with the first data object. For example, when the first data object is "message" as described above, the second control instruction may control the second interaction interface associated with "message", e.g., "write a message" and "unread messages" as shown in FIG. 6A. When the first data object is "camera", the second interaction interface may be an interface shown in FIG. 6B. Of course, the second interaction interface may be selected by those skilled in the art as desired and the present disclosure is not limited to this.

Further, when the movement direction varies, a second data object different from the first data object may be determined. For example, the first data object may be "message" while the second data object may be "music". Thus, the user may trigger the second graphic interaction interface conveniently with movements in various directions.

Of course, in an embodiment of the present disclosure, when the user has activated the first graphic interaction interface with the operator and does not want to proceed with any operation, he/she may deactivate (close) the first graphic interaction interface as follows.

It is judged whether the input action satisfies a third predetermined condition to obtain a third judgment result.

The third predetermined condition is satisfied when the operator changes from the second attitude to the first attitude or maintains the second attitude for at least a predetermined time period.

When the third judgment result indicates that the input action satisfies the third predetermined condition, the input action is determined as a third input action.

A third control instruction is generated based on the third input action and, in response to the third control instruction, the first graphic interaction interface is hidden.

In particular, in an embodiment of the present disclosure, after determining that the input action satisfies the first predetermined condition, it may be judged whether the input action satisfies a third predetermined condition. In particular, the third predetermined condition is satisfied when the operator changes from the second attitude to the first attitude. For example, the operator may changes from the second attitude, which is an opened palm, to the first attitude, which is a clenched fist. As another example, the operator may changes from the second attitude, which is the operator stretching out one of the fingers and bending the other four fingers towards the center of the palm, to the first attitude, which is a clenched fist.

Alternatively, the third predetermined condition may be satisfied when the operator maintains the second attitude (e.g., the operator opening the palm or the operator stretching out one of the fingers and bending the other four fingers towards the center of the palm) for at least a predetermined time period. In particular, the predetermined time period may be 5 seconds or 7 seconds. The predetermined time period may be selected by those skilled in the art as desired and the present disclosure is not limited to this.

When the input action satisfies the third predetermined condition, i.e., when the operator changes from the second attitude to the first attitude or maintains the second attitude for at least the predetermined time period, the input action is determined as the third input action.

Further, a third control instruction is generated based on the third input action directly or by looking up an instruction table, and is then responded to. In an embodiment of the present disclosure, the third control instruction is a control instruction to hide the first graphic interaction interface. In particular, in an embodiment of the present disclosure, the first graphic interaction interface may be hidden by hiding it to the edge, adjusting its transparency to 100% or scaling it down to an area smaller than a predetermined value, e.g., 0.1 $mm^2$. It may be selected by those skilled in the art as desired and the present disclosure is not limited to this.

Further, in order to enable the user to observe whether his/her action satisfies the first and second predetermined conditions accurately while activating the first or second interaction interface, in an embodiment of the present disclosure, an image may be displayed on the display unit or directly on a display screen having a mirror reflection effect. In this way, the user may conveniently observe the mapped position at which the first graphic interaction interface is displayed, so as to accurately perform the second input action for activating the second graphic interaction interface as desired.

Example Two

Referring to FIG. 7, an electronic device is provided according to an embodiment of the present disclosure. The electronic device includes a display unit and a sensing unit. The electronic device further includes the following units.

A first obtaining unit 71 is configured to obtain at least one sensed parameter of an operator using the sensing unit.

A first determining unit 72 is configured to determine a parameter change of the operator based on the at least one sensed parameter.

A first judging unit 73 is configured to judge, based on the parameter change, whether an input action of the operator satisfies a first predetermined condition, so as to obtain a first judgment result. The first predetermined condition is satisfied when the operator changes from a first attitude to a second attitude different from the first attitude.

A second determining unit 74 is configured to determine the input action of the operator as a first input action and determine a mapped position of the operator on the display unit based on the parameter change, when the first judgment result indicates that the input action satisfies the first predetermined condition.

A third determining unit 75 is configured to determine a first control instruction associated with the first input action.

A first responding unit 76 is configured to display a first graphic interaction interface at the mapped position in response to the first control instruction.

In particular, in an embodiment of the present disclosure, the sensing unit may include a remote interaction sensing unit and/or a touch interaction sensing unit. The remote interaction sensing unit has a capture space in front of the display unit. In this embodiment, the first obtaining unit 71 is configured to obtain the at least one sensed parameter of the operator using the remote interaction sensing unit and/or the touch interaction sensing unit. More specifically, the first obtaining unit is configured to: obtain at least one first sensed parameter using the remote interaction sensing unit; and/or obtain at least one second sensed parameter using the touch interaction sensing unit.

In particular, in an embodiment of the present disclosure, the first determining unit 72 is configured to: determine a first processing mechanism associated with the remote interaction sensing unit, and determine a parameter change of the at least one first sensed parameter based on the first processing mechanism; and/or determine a second processing mechanism associated with the touch interaction sensing unit, the second processing mechanism being different from the first processing mechanism, and determine a parameter change of the at least one second sensed parameter based on the second processing mechanism.

In particular, in an embodiment of the present disclosure, the first judging unit 73 is configured to: judge whether the input action of the operator satisfies the first predetermined condition based on the parameter change of the at least one first sensed parameter and/or the parameter change of the at least one second sensed parameter, so as to obtain the first judgment result.

In particular, in an embodiment of the present disclosure, the second determining unit 74 is configured to: determine the input action of the operator as the first input action when the first judgment result as obtained based on the parameter change of the at least one first sensed parameter and/or the parameter change of the at least one second sensed parameter indicates that the input action satisfies the first predetermined condition; and determine the mapped position based on a first parameter, which is a changed first sensed parameter, and/or a second parameter, which is a changed second sensed parameter.

In an embodiment of the present disclosure, the electronic device further includes: a second judging unit configured to judge whether the input action satisfies a second predetermined condition, so as to obtain a second judgment result, the second predetermined condition being satisfied when the operator changes from the first attitude to the second attitude different from the first attitude and moves in the second attitude; a fourth determining unit configured to determine the input action as a second input action when the second judgment result indicates that the input action satisfies the second predetermined condition; and a second responding unit configured to generate a second control instruction based on the first graphic interaction interface and a movement parameter of the second input action and display, in response to the second control instruction, a second graphic interaction interface at the mapped position.

In an embodiment of the present disclosure, the electronic device further includes: a third judging unit configured to judge whether the input action satisfies a third predetermined condition, so as to obtain a third judgment result, the third predetermined condition being satisfied when the operator changes from the second attitude to the first attitude or maintains the second attitude for at least a predetermined time period; a fifth determining unit configured to determine the input action as a third input action when the third judgment result indicates that the input action satisfies the third predetermined condition; and a third responding unit configured to generate a third control instruction based on the third input action and hide, in response to the third control instruction, the first graphic interaction interface.

In particular, when the first graphic interaction interface contains N data objects, where N is a positive integer, the second responding unit is configured to: obtain a movement trajectory of the second input action; determine a movement direction of the movement trajectory as a first movement direction and determine the first movement direction as the movement parameter; determine a first data object out of the N data objects that corresponds to the first movement direction based on the movement parameter; and determine the second control instruction based on the first data object.

Alternatively, the second responding unit is configured to: after obtaining the movement trajectory of the second input action, determine a movement direction of the movement trajectory as a second movement direction different from the first movement direction and determine the second movement direction as the movement parameter; determine a second data object, different from the first data object, out of the N data objects that corresponds to the second movement direction based on the movement parameter; and determine the second control instruction based on the second data object.

Further, in an embodiment of the present disclosure, the display unit is capable of displaying a dynamic image of the operator as captured by the remote interaction sensing unit or mirroring a first virtual image of the operator.

The dynamic image or the first virtual image indicates an operation position of the operator on the display unit, the operation position corresponding to the mapped position.

Figure 8:
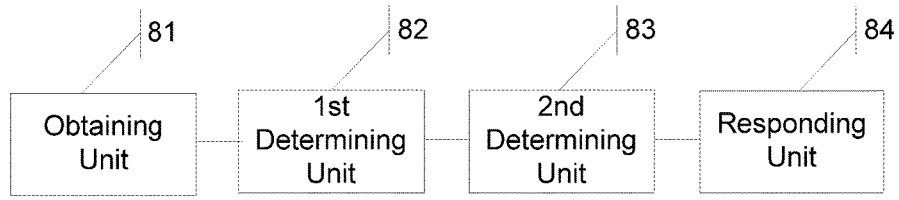
FIG. 8 is a schematic diagram showing a structure of an electronic device according to an exemplary embodiment of the present disclosure.

In another embodiment of the present disclosure, an electronic device is provided. The electronic device includes a display unit, a remote interaction sensing unit and a touch interaction sensing unit. The remote interaction sensing unit has a capture space in front of the display unit. As shown in FIG. 8, the electronic device further includes the following units.

An obtaining unit 81 is configured to obtain at least one sensed parameter of an operator by the remote interaction sensing unit applying a first processing mechanism and/or by the touch interaction sensing unit applying a second processing mechanism.

A first determining unit 82 is configured to determine an input action of the operator and a mapped position of the operator on the display unit based on the at least one sensed parameter.

A second determining unit 83 is configured to determine a control instruction associated with the input action.

A responding unit 84 is configured to display a graphic interaction interface at the mapped position in response to the control instruction.

Figure 9:
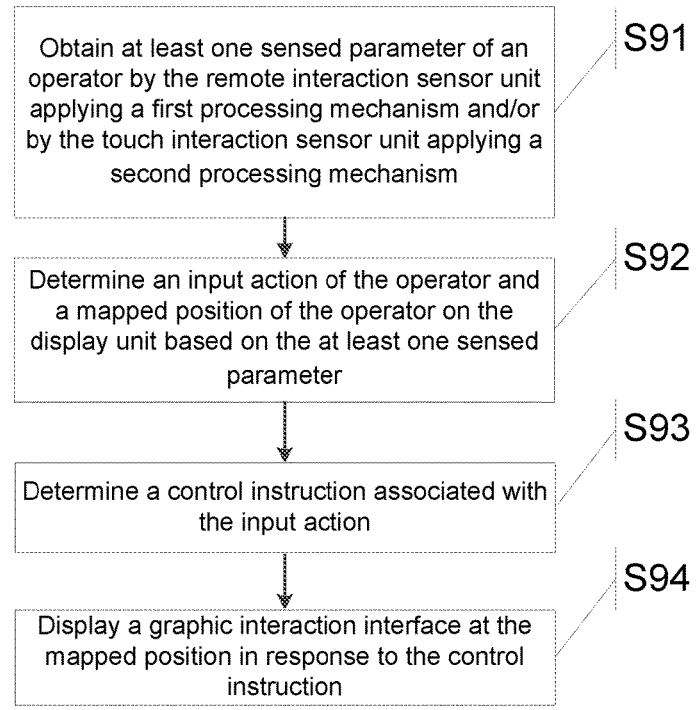
FIG. 9 is a flowchart illustrating an information processing method according to an exemplary embodiment of the present disclosure.

In another embodiment of the present disclosure, an information processing method is provided. Referring to FIG. 9, the information processing method includes the following steps.

At step S91 at least one sensed parameter of an operator is obtained by the remote interaction sensing unit applying a first processing mechanism and/or by the touch interaction sensing unit applying a second processing mechanism.

At step S92, an input action of the operator and a mapped position of the operator on the display unit are determined based on the at least one sensed parameter.

At step S93, a control instruction associated with the input action.

At step S94, a graphic interaction interface at the mapped position is displayed in response to the control instruction.

It may be appreciated by those skilled in the art that the embodiments of the present disclosure may be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It may be appreciated that each process and/or block in the flowcharts and/or block diagrams, or any combination thereof, may be implemented by computer program instructions. Such computer program instructions may be provided to a general computer, a dedicated computer, an embedded processor or a processor of any other programmable data processing device to constitute a machine, such that the instructions executed by the computer or the processor of any other programmable data processing device may constitute means for implementing the functions specified by one or more processes in the flowcharts and/or one or more blocks in the block diagrams.

These computer program instructions may also be stored in a computer readable memory that may direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions may also be loaded onto a computer or any other programmable data processing device, such that the computer or the programmable data processing device may perform a series of operations/steps to achieve a computer-implemented process. In this way, the instructions executed on the computer or the programmable data processing device may provide steps for implementing the functions specified by one or more processes in the flowcharts and/or one or more blocks in the block diagrams.

In particular, the computer program instructions for implementing the information processing method according to the embodiment of the present disclosure may be stored on a storage medium such as an optical disc, a hard disk or a flash memory. The computer program instructions stored in the storage medium for implementing the information processing method include, when read or executed by an electronic device, the following steps of: obtaining at least one sensed parameter of an operator using the sensing unit; determining a parameter change of the operator based on the at least one sensed parameter; judging, based on the parameter change, whether an input action of the operator satisfies a first predetermined condition, so as to obtain a first judgment result, the first predetermined condition being satisfied when the operator changes from a first attitude to a second attitude different from the first attitude; determining the input action of the operator as a first input action and determining a mapped position of the operator on the display unit based on the parameter change, when the first judgment result indicates that the input action satisfies the first predetermined condition; determining a first control instruction associated with the first input action; and displaying a first graphic interaction interface at the mapped position in response to the first control instruction.

Alternatively, the computer program instructions stored in the storage medium for obtaining at least one sensed parameter of the operator using the sensing unit include, when executed: obtaining the at least one sensed parameter of the operator using the remote interaction sensing unit and/or the touch interaction sensing unit.

Alternatively, the computer program instructions stored in the storage medium for obtaining the at least one sensed parameter of the operator using the remote interaction sensing unit and/or the touch interaction sensing unit include, when executed: obtaining at least one first sensed parameter using the remote interaction sensing unit; and/or obtaining at least one second sensed parameter using the touch interaction sensing unit.

Alternatively, the computer program instructions stored in the storage medium for determining the parameter change of the operator based on the at least one sensed parameter include, when executed: determining a first processing mechanism associated with the remote interaction sensing unit, and determining a parameter change of the at least one first sensed parameter based on the first processing mechanism; and/or determining a second processing mechanism associated with the touch interaction sensing unit, the second processing mechanism being different from the first processing mechanism, and determining a parameter change of the at least one second sensed parameter based on the second processing mechanism.

Alternatively, the computer program instructions stored in the storage medium for determining the input action of the operator as the first input action and determining the mapped position of the operator on the display unit based on the parameter change include, when executed: determining the input action of the operator as the first input action when the first judgment result as obtained based on the parameter change of the at least one first sensed parameter and/or the parameter change of the at least one second sensed parameter indicates that the input action satisfies the first predetermined condition; and determining the mapped position based on a first parameter, which is a changed first sensed parameter, and/or a second parameter, which is a changed second sensed parameter.

Alternatively, the computer program instructions stored in the storage medium for implementing the method include,
when executed: determining to invoke the first processing mechanism when a distance between the operator and the display unit exceeds a threshold.

Alternatively, the at least one first sensed parameter is obtained from M images of the operator as captured by the remote interaction sensing unit in real time, where M is an integer equal to or larger than 2.

Alternatively, the storage medium further stores computer program instructions that include, when executed subsequent to said determining the first control instruction associated with the first input action and displaying the first graphic interaction interface at the mapped position in response to the first control instruction: judging whether the input action satisfies a second predetermined condition to obtain a second judgment result, the second predetermined condition being satisfied when the operator changes from the first attitude to the second attitude different from the first attitude and moves in the second attitude; determining the input action as a second input action when the second judgment result indicates that the input action satisfies the second predetermined condition; and generating a second control instruction based on the first graphic interaction interface and a movement parameter of the second input action and displaying, in response to the second control instruction, a second graphic interaction interface at the mapped position.

Alternatively, the storage medium further stores computer program instructions that include, when executed subsequent to said determining the first control instruction associated with the first input action and displaying the first graphic interaction interface at the mapped position in response to the first control instruction: judging whether the input action satisfies a third predetermined condition to obtain a third judgment result, the third predetermined condition being satisfied when the operator changes from the second attitude to the first attitude or maintains the second attitude for at least a predetermined time period; determining the input action as a third input action when the third judgment result indicates that the input action satisfies the third predetermined condition; and generating a third control instruction based on the third input action and hiding, in response to the third control instruction, the first graphic interaction interface.

Alternatively, when the first graphic interaction interface contains N data objects, where N is a positive integer, the computer program instructions stored in the storage medium for generating the second control instruction based on the first graphic interaction interface and the movement parameter of the second input action and displaying, in response to the second control instruction, the second graphic interaction interface at the mapped position include, when executed: obtaining a movement trajectory of the second input action; determining a movement direction of the movement trajectory as a first movement direction and determining the first movement direction as the movement parameter; determining a first data object out of the N data objects that corresponds to the first movement direction based on the movement parameter; and determining the second control instruction based on the first data object.

Alternatively, the display unit is capable of displaying a dynamic image of the operator as captured by the remote interaction sensing unit or mirroring a first virtual image of the operator.

Alternatively, the dynamic image or the first virtual image indicates an operation position of the operator on the display unit, the operation position corresponding to the mapped position.

According to another embodiment of the present disclosure, the computer program instructions stored in the storage medium for implementing the information processing method include, when read or executed by an electronic device, the following steps of: obtaining at least one sensed parameter of an operator by the remote interaction sensing unit applying a first processing mechanism and/or by the touch interaction sensing unit applying a second processing mechanism; determining an input action of the operator and a mapped position of the operator on the display unit based on the at least one sensed parameter; determining a control instruction associated with the input action; and displaying a graphic interaction interface at the mapped position in response to the control instruction.

Obviously, various modifications and variants may be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An information processing method applied in an electronic device comprising a mirror display and a remote interaction sensor, the method comprising:
    obtaining at least one sensed parameter of a hand of a user using the remote interaction sensor;
    determining a parameter change of the hand based on the at least one sensed parameter;
    judging, based on the parameter change, whether an input action of the hand satisfies a first predetermined condition, so as to obtain a first judgment result, the first predetermined condition being satisfied when the hand changes from clenching a fist to opening a palm;
    determining the input action of the hand as a first input action and determining a mapped position of the hand on the mirror display based on the parameter change, when the first judgment result indicates that the input action satisfies the first predetermined condition, the mapped position being an operation position of the hand on the mirror display, wherein a virtual image of the hand mirror-reflected by the mirror display is observable by human eyes at the mapped position with no graphic interaction interface being displayed at the mapped position;
    determining a first control instruction associated with the first input action; and
    activating a first graphic interaction interface at the mapped position in response to the first control instruction, wherein an activated position of the first graphic interaction interface varies with change of the mapped position on the mirror display at which the virtual image of the hand mirror-reflected by the mirror display is observable by the human eyes, and
    data objects contained in the first graphic interaction interface are displayed around the virtual image of the hand mirror-reflected by the mirror display.

2. The method of claim 1, wherein the electronic device further comprises a touch interaction sensor, and the remote interaction sensor has a capture space in front of the mirror display, and
    the method further comprises obtaining the at least one sensed parameter of the hand using the touch interaction sensor.

3. The method of claim 2, wherein:
    said obtaining the at least one sensed parameter of the hand using the remote interaction sensor comprises obtaining at least one first sensed parameter using the remote interaction sensor; and/or
    said obtaining the at least one sensed parameter of the hand using the touch interaction sensor comprises obtaining at least one second sensed parameter using the touch interaction sensor.

4. The method of claim 3, wherein said determining the parameter change of the hand based on the at least one sensed parameter comprises:
    determining a first processing mechanism associated with the remote interaction sensor, and determining a parameter change of the at least one first sensed parameter based on the first processing mechanism; and/or
    determining a second processing mechanism associated with the touch interaction sensor, the second processing mechanism being different from the first processing mechanism, and determining a parameter change of the at least one second sensed parameter based on the second processing mechanism.

5. The method of claim 4, wherein the step of determining the input action of the hand as the first input action and determining the mapped position of the hand on the mirror display based on the parameter change comprises steps of:
    determining the input action of the hand as the first input action, when the first judgment result as obtained based on the parameter change of the at least one first sensed parameter and/or the parameter change of the at least one second sensed parameter indicates that the input action satisfies the first predetermined condition; and
    determining the mapped position based on a first parameter, which is a changed first sensed parameter, and/or a second parameter, which is a changed second sensed parameter.

6. The method of claim 4, further comprising a step of:
    determining to invoke the first processing mechanism when a distance between the hand and the mirror display exceeds a threshold.

7. The method of claim 3, wherein the at least one first sensed parameter is obtained from M images of the hand as captured by the remote interaction sensor in real time, where M is an integer equal to or larger than 2.

8. The method of claim 7, further comprising, subsequent to the steps of determining the first control instruction associated with the first input action and activating the first graphic interaction interface at the mapped position in response to the first control instruction, steps of:
    judging whether the input action satisfies a second predetermined condition, so as to obtain a second judgment result, the second predetermined condition being satisfied when the hand changes from the clenching the fist to the opening the palm and moves in a form of opening the palm;
    determining the input action as a second input action when the second judgment result indicates that the input action satisfies the second predetermined condition; and
    generating a second control instruction based on the first graphic interaction interface and a movement parameter of the second input action and activating, in response to the second control instruction, a second graphic interaction interface at the mapped position.

9. The method of claim 7, further comprising, subsequent to the steps of determining the first control instruction associated with the first input action and activating the first graphic interaction interface at the mapped position in response to the first control instruction, steps of:

judging whether the input action satisfies a third predetermined condition, so as to obtain a third judgment result, the third predetermined condition being satisfied when the hand changes from the opening the palm to the clenching the fist or maintains the opening the palm for at least a predetermined time period;

determining the input action as a third input action when the third judgment result indicates that the input action satisfies the third predetermined condition; and generating a third control instruction based on the third input action and hiding, in response to the third control instruction, the first graphic interaction interface.

10. The method of claim 8, wherein, when the first graphic interaction interface contains N data objects, where N is a positive integer, the steps of generating the second control instruction based on the first graphic interaction interface and the movement parameter of the second input action and displaying, in response to the second control instruction, the second graphic interaction interface at the mapped position comprises steps of:

obtaining a movement trajectory of the second input action;

determining a movement direction of the movement trajectory as a first movement direction and determining the first movement direction as the movement parameter;

determining a first data object out of the N data objects that corresponds to the first movement direction based on the movement parameter; and determining the second control instruction based on the first data object.

11. An electronic device comprising a mirror display and a remote interaction sensor, wherein the electronic device further comprises a processor and a memory, wherein the memory stores instructions which, when executed by the processor, cause the processor to:

obtain at least one sensed parameter of a hand of a user using the remote interaction sensor;

determine a parameter change of the hand based on the at least one sensed parameter;

judge, based on the parameter change whether an input action of the hand satisfies a first predetermined condition, so as to obtain a first judgment result, the first predetermined condition being satisfied when the hand changes from clenching a fist to opening a palm;

determine the input action of the hand as a first input action and determine a mapped position of the hand on the mirror display based on the parameter change, when the first judgment result indicates that the input action satisfies the first predetermined condition, the mapped position being an operation position of the hand on the mirror display, wherein indicated by a virtual image of the hand mirror-reflected by the mirror display is observable by human eyes at the mapped position with no graphic interaction interface being displayed at the mapped position;

determine a first control instruction associated with the first input action; and activate a first graphic interaction interface at the mapped position in response to the first control instruction, wherein an activated position of the first graphic interaction interface varies with change of the mapped position on the mirror display which is indicated by the virtual image of the hand mirror-reflected by the mirror display, and data objects contained in the first graphic interaction interface are displayed around the virtual image of the hand mirror-reflected by the mirror display.

12. The electronic device of claim 11, wherein the electronic device further comprises a touch interaction sensor, and the remote interaction sensor has a capture space in front of the mirror display, and wherein the instructions, when executed by the processor, further cause the processor to obtain the at least one sensed parameter of the hand using the touch interaction sensor.

13. The electronic device of claim 12, wherein the instructions, when executed by the processor, further cause the processor to:

obtain at least one first sensed parameter using the remote interaction sensor; and/or obtain at least one second sensed parameter using the touch interaction sensor.

14. The electronic device of claim 13, wherein the instructions, when executed by the processor, further cause the processor to:

determine a first processing mechanism associated with the remote interaction sensor, and determine a parameter change of the at least one first sensed parameter based on the first processing mechanism; and/or determine a second processing mechanism associated with the touch interaction sensor, the second processing mechanism being different from the first processing mechanism, and determine a parameter change of the at least one second sensed parameter based on the second processing mechanism.

15. The electronic device of claim 14, wherein the instructions, when executed by the processor, further cause the processor to:

determine the input action of the hand as the first input action when the first judgment result as obtained based on the parameter change of the at least one first sensed parameter and/or the parameter change of the at least one second sensed parameter indicates that the input action satisfies the first predetermined condition; and determine the mapped position based on a first parameter, which is a changed first sensed parameter, and/or a second parameter, which is a changed second sensed parameter.

16. The electronic device of claim 14, wherein the first processing mechanism is determined to be invoked when a distance between the hand and the mirror display exceeds a threshold.

17. The electronic device of claim 13, wherein the at least one first sensed parameter is obtained from M images of the hand as captured by the remote interaction sensor in real time, where M is an integer equal to or larger than 2.

18. The electronic device of claim 17, wherein the instructions, when executed by the processor, further cause the processor to:

judge whether the input action satisfies a second predetermined condition, so as to obtain a second judgment result, the second predetermined condition being satisfied when the hand changes from the clenching the fist to the opening of palm and moves in a form of opening the palm;

determine the input action as a second input action when the second judgment result indicates that the input action satisfies the second predetermined condition; and generate a second control instruction based on the first graphic interaction interface and a movement parameter of the second input action and activate, in response to the second control instruction, a second graphic interaction interface at the mapped position.

19. The electronic device of claim 17, wherein the instructions, when executed by the processor, further cause the processor to:
    judge whether the input action satisfies a third predetermined condition, so as to obtain a third judgment result, the third predetermined condition being satisfied when the hand changes from the opening the palm to the clenching the fist or maintains the opening the palm for at least a predetermined time period;
    determine the input action as a third input action when the third judgment result indicates that the input action satisfies the third predetermined condition; and
    generate a third control instruction based on the third input action and hide, in response to the third control instruction, the first graphic interaction interface.

20. The electronic device of claim 18,
    wherein, when the first graphic interaction interface contains N data objects, where N is a positive integer, and
    wherein the instructions, when executed by the processor, further cause the processor to
        obtain a movement trajectory of the second input action;
        determine a movement direction of the movement trajectory as a first movement direction and determine the first movement direction as the movement parameter;
        determine a first data object out of the N data objects that corresponds to the first movement direction based on the movement parameter; and
        determine the second control instruction based on the first data object.

21. An information processing method applied in an electronic device comprising a mirror display, a remote interaction sensor and a touch interaction sensor the remote interaction sensor having a capture space in front of the mirror display, the method comprising:
    obtaining at least one sensed parameter of a hand of a user by the remote interaction sensor when the electronic device is applying a first processing mechanism and by the touch interaction sensor when the electronic device is applying a second processing mechanism;
    determining an input action of the hand as changing from clenching a fist to opening a palm and determining a mapped position of the hand on the mirror display based on the at least one sensed parameter, the mapped position being an operation position of the hand on the mirror display, wherein a virtual image of the hand mirror-reflected by the mirror display is observable by human eyes at the mapped position with no graphic interaction interface being displayed at the mapped position;
    determining a control instruction associated with the input action; and
    activating a graphic interaction interface at the mapped position in response to the control instruction, wherein an activated position of the first graphic interaction interface varies with change of the mapped position on the mirror display at which the virtual image of the hand mirror-reflected by the mirror display is be observable by the human eyes, and data objects contained in the first graphic interaction interface are displayed around the virtual image of the hand mirror-reflected by the mirror display.

* * * * *